(12) United States Patent
Johnston (10) Patent No.: US 11,654,357 B1
(45) Date of Patent: May 23, 2023

(54) COMPUTERIZED METHOD AND COMPUTING PLATFORM FOR CENTRALLY MANAGING SKILL-BASED COMPETITIONS

(71) Applicant: MetaSkillVerse, LLC, Lewes, DE (US)

(72) Inventor: Richard Johnston, Lancaster, CA (US)

(73) Assignee: METAFLO, LLC, Lancaster, CA (US)

( * ) Notice: Subject to any disclaimer, the term of this patent is extended or adjusted under 35 U.S.C. 154(b) by 0 days.

(21) Appl. No.: 17/878,503

(22) Filed: Aug. 1, 2022

(51) Int. Cl.
*A63B 71/06* (2006.01)
*A63F 13/52* (2014.01)
*G06V 20/40* (2022.01)
*A63F 13/35* (2014.01)
*G06V 20/30* (2022.01)

(52) U.S. Cl.
CPC .............. *A63F 13/52* (2014.09); *A63F 13/35* (2014.09); *G06V 20/30* (2022.01); *G06V 20/42* (2022.01); *G06V 20/46* (2022.01)

(58) Field of Classification Search
CPC ......... A63F 13/52; A63F 13/35; G06V 20/30; G06V 20/42; G06V 20/46
USPC .......................................................... 463/31
See application file for complete search history.

(56) References Cited

U.S. PATENT DOCUMENTS

| | | | | |
|---|---|---|---|---|
| 5,380,978 | A * | 1/1995 | Pryor | B23K 26/0846 219/121.79 |
| 11,575,838 | B2 * | 2/2023 | Meng | H04N 17/002 |
| 2006/0251384 | A1 * | 11/2006 | Vronay | H04N 7/15 386/280 |
| 2012/0021389 | A1 * | 1/2012 | Wakamoto | G09B 5/04 434/156 |
| 2012/0077574 | A1 * | 3/2012 | Walker | G07F 17/3255 463/25 |
| 2012/0244935 | A1 * | 9/2012 | Burckart | A63F 13/42 463/36 |
| 2014/0002494 | A1 * | 1/2014 | Cunningham | G09G 5/00 345/633 |
| 2015/0126333 | A1 * | 5/2015 | Jones | G16H 20/30 482/9 |
| 2015/0268043 | A1 * | 9/2015 | McFadden | G01C 11/02 702/159 |
| 2017/0050081 | A1 * | 2/2017 | Jones | A63F 13/795 |
| 2021/0073694 | A1 * | 3/2021 | Yellin | G06Q 10/06313 |

(Continued)

*Primary Examiner* — Michael A Cuff
(74) *Attorney, Agent, or Firm* — Timothy J. Bechen; Woods Rogers Vandeventer Black (57) ABSTRACT

A computerized method and computing platform provides for managing a skill-based competition via network-based submissions. The method includes providing event rules across a communication network to a first user, the event rules relating to competing in the skill-based competition. Via the communication network, the method includes receiving an entry submission from the first user, the entry submission including score data and video data relating to a video feed of the first user competing in the skill-based competition. The method includes analyzing the video feed of the first user competing in the skill-based competition using at least one photogrammetry processing technique, including validating if the first user was in compliance with the event rules while competing in the skill-based competition. Based thereon, a verification score is compared with the score data and the method manages a leaderboard data set as part of managing the competition.

17 Claims, 8 Drawing Sheets

(56) References Cited

U.S. PATENT DOCUMENTS

| | | | | |
|---|---|---|---|---|
| 2021/0346779 | A1* | 11/2021 | Ayers | H04N 5/77 |
| 2021/0356953 | A1* | 11/2021 | Zavesky | G06V 20/20 |
| 2021/0365052 | A1* | 11/2021 | Burdick | G08G 5/0013 |
| 2022/0021921 | A1* | 1/2022 | Osman | G06Q 30/0269 |
| 2022/0044538 | A1* | 2/2022 | Al-Yousef | G05B 23/0267 |
| 2022/0051048 | A1* | 2/2022 | Rau | G06F 18/214 |
| 2022/0051372 | A1* | 2/2022 | Toft | G06T 3/00 |
| 2022/0165119 | A1* | 5/2022 | Huke | G07F 17/3288 |
| 2022/0203234 | A1* | 6/2022 | Olabode | A63F 13/5252 |
| 2022/0366654 | A1* | 11/2022 | Elices | G06T 15/205 |
| 2023/0015535 | A1* | 1/2023 | Smeltzer | G06Q 30/08 |
| 2023/0062756 | A1* | 3/2023 | Takeda | G06T 13/40 |

* cited by examiner

| SHOOTING COMPETITION ||
|---|---|
| LOCATION | REGULATION BASKETBALL COURT |
| EQUIPMENT | BALL : xx CM RADIUS<br>HOOP : XX cm RADIOUS |
| CAMERA 1 LOCATION | 45 DEGREE ANGLE : 6 FEET DISTANCE |
| SUBMISSION TIME | 3 MINUTES |
|  |  |
| ENTRY FEE | 1 TOKEN |
| COMP. OPEN / CLOSE | 03/01/2023 – 03/30/2023 |

FIG. 3

| VIDEOGAME COMPETITION ||
|---|---|
| LOCATION | MOBILE : CALL OF DUTY APP |
| EQUIPMENT | SMARTPHONE<br>CALL OF DUTY : V4.2 – V5.0 |
| CAMERA 1 LOCATION | 18 INCHES FROM MOBILE SCREEN |
| SUBMISSION TIME | 3 MINUTES |
|  |  |
| ENTRY FEE | 1 TOKEN |
| COMP. OPEN / CLOSE | 03/01/2023 – 03/30/2023 |

COMPUTERIZED METHOD AND COMPUTING PLATFORM FOR CENTRALLY MANAGING SKILL-BASED COMPETITIONS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to an electronic competition management platform and more specifically a computerized method and computing platform for centrally managing network-based submissions of one or more skill-based competitions.

BACKGROUND

It is well known to have in-person skill-based competitions, for example a group of friends competing to shoot the highest number of free-throws, throwing darts at a dartboard, etc. In the current connected environment, person against person competitions are complicated, including ensuring fair play between competitors.

Skill-based competitions can also take place in videogames, for example competing in a mini-game, completing an in-game challenge, etc. Similar to in-person competitions, concern arise regarding fair play, for example if competitors are using cheat-codes or other hacks.

Integrity of the competition is paramount. Competitors need to feel assured their best efforts are being fairly measured against their competitors. If a competitor can be allowed to cheat, users will not compete and will question the competition results.

As users continue to engage in online activities, there is no current solution for facilitating skill-based competitions with competitors in different geographic locations. There are many shared communication platforms improving the online and connected communities.

While the world and users are more interconnected, sharing of online content is primarily for consumer consumption. Aside from likes, views, fame, or advertising revenue, content creation and distribution is a one-way forum with terra-bytes of content sharing across numerous platforms.

Missing is a system and computerized method that allows people, friends, and complete strangers, to compete against each other in skill-based competitions. Without a centralized platform to ensure competition integrity, there is no way to know if competing efforts are comparable. Moreover, there lacks a community for fair competition based on shared rules allowing for any user to fairly compete against any other user, independent of physical locations.

Therefore, there exists a need for a method and system that builds upon the current online and connected community to facilitate and authenticate skill-based competitions, including managing the competition, validating user submission integrity, leaderboard activities, and crowning a competition winner.

BRIEF DESCRIPTION

As described herein, the present method and system allows an unlimited number of users to compete against each other in a skill-based competition. The method and system facilitates a centralized processing platform to manage electronic submissions, validating the integrity of the submissions, and managing leaderboards for determining (and validating) one or more winners.

The method and system works with any skill-based competition, including physical competitions as well as virtual or in-game videogame competitions. The skill-based competition is any suitable competition having predetermined rules, such as event rules, that govern various features, such as scoring, spacing requirements, equipment rules, videogame setting rules, camera positions, by way of example.

The computerized method and system includes providing event rules to users. The event rules are a first order of uniformity in the competition submissions by defining the limits and foundation of the competition.

For example, a skill-based competition can be making the most free-throws in three minutes. In this example, the event rules can outline the size of the basketball, the width of the basketball hoop, the distance of the free throw line from the basketball hoop, a competition time period of three minutes, and at least one camera placement requirement to livestream the competition submission.

Prior to competing, the user can then prepare by practicing and ensuring the physical set-up matches the event rules. When the user is ready to formally compete, the user begins livestreaming his or her effort. This livestream submission is part of an entry submission. The livestream feed displays the user's effort, any number of viewers being able to watch the effort in real-time.

The user tracks his or her own score. In the basketball example, the user can track the number of made baskets within the time limit. As part of the entry submission, the user then submits score data. In one embodiment, a link to the livestream feed is also submitted as video data. The livestream content can be viewed in real-time, but the livestream content feed can additionally be stored for later access. Thus, the video data may include not only the livestream link feed, but also address or other data for accessing a stored version of the feed.

The method and system can operate varying embodiments depending on the nature of the competition and the number of entrants. In competitions having a large number of entrants, the method and system can manage the leaderboard under a first and not-first categorization. Whereby once a leaderboard is established, entry submissions that are not-first can be discarded.

For example, if the current leader has made 42 free throws in 3 minutes, an entry submission with user-generated score data indicating completion of 18 free throws can be discarded as not-first. By contrast, if the score data of the entry submission indicates making 44 free throws, the method and system can then seek to verify the authenticity of the new entry submission.

The method and system analyzes the video feed of the first user competing in the skill-based competition using photogrammetry techniques. These techniques analyzes the video feed to authenticate compliance with the event rules. In the example of the basketball competition, this can include validating the ball size, the hoop distance, etc. As the event rules include camera placement, the photogrammetry engine is thus able to uniformly analyze the video submissions.

The authenticity of the entry submission is partially validated by being a livestream. As the user's competition attempt is being recorded and transmitted in real-time, this either eliminates or greatly reduces any chance of video manipulation, and thus cheating. But as the user's score is not determined until after the competition is completed, the video feed analysis is based on a recorded version of the livestream content.

Part of the video analysis includes generating a verification score. In one embodiment, the photogrammetry operations can be programmed to calculate this score by capturing scoring events. In another embodiment, depending on the number of submissions, one or more users may physically view the submission and generate a score. For example, the validation score generation can be crowd-sourced by having online community members watch and score the video.

As part of the integrity of the competition, the verification score is compared to the score data submitted by the user. In one embodiment, if the user submits an incorrect score, their submission is invalidated. In another embodiment, if the user submits a score greater than their actual score, their submission is invalidated.

Based thereon, the method and system can update a leaderboard data set. If the analysis of the video feed confirms the entry submission is a new top or first-place submission, the leaderboard data is updated. If the entry submission is invalidated, the leaderboard data remains the same.

The method and system operates to manage the skill-based competition over any suitable period of time. During this competition interval, the method and system manages the multiple submissions, processing the submissions and managing the leaderboard. Based on the photogrammetry operations, the method and system can operate in a real-time or near real-time fashion processing virtually unlimited number of entries.

In one embodiment, the method and system can include an entry fee or other type of submission payment. The winning prize or prizes can be based supported by or based on the entry fee. Moreover, the method and system can additionally facilitate community engagement through the competition, including social content such as playing favorite or top-score entries, by way of example. The method and system may additionally integrate advertising or other sponsored content in the submission videos, for example one embodiment may include embedded overlay image(s) of advertising or promotional material.

Therein, the method and system can provide an automated processing system for managing the skill-based competition. For example, the competition can extend over a 30 day period, allowing users to submit multiple entries per day. The method and system can manage millions of entry submissions, filtering initial submission results and using a photogrammetry engine to validate. Concurrently, the method and system allows for an online community of users to compete with each other, assured in knowing fair play amongst fellow competitors, and assured in knowing the winner is the rightful winner.

In further embodiments, the method and system includes a game engine for developing or otherwise facilitating skill-based competition. The game engine operations vary based on the competition being a physical competition or a video game competition. For the physical competitions, the game engine generates or facilitates generation of the competition through generating or analyzing the event rules. For the video game competitions, the game engine can be an electronic processing engine facilitating fair play, for example being a gaming engine for having video game(s) run thereon or in another example being a processing module running on top of a pre-existing game or gaming platform that inhibits cheating or other unfair user events or gaming operations.

BRIEF DESCRIPTION OF THE DRAWINGS

A better understanding of the disclosed technology will be obtained from the following detailed description of the preferred embodiments taken in conjunction with the drawings and the attached claims.

DETAILED DESCRIPTION

Various embodiments are described herein, both directly and inherently. However, it is understood that the described embodiments and examples are not expressly limiting in nature, instead illustrate examples of the advantageous uses of the innovative teachings herein. In general, statements made in the specification of the present application do not necessarily limit any of the various claimed inventions and it is recognized that additional embodiments and variations recognized by one or more skilled in the art are incorporated herein.

The present invention connects all physical locations, sporting equipment, and allows unlimited number of people to enter and perform in worldwide skill-based, physical and/or mental competitions/tournaments/activities under standardized conditions that are instantly verifiable, allowing the winner to be crowned and rewarded within minutes. The specific type of competitions/games that allow massive numbers of individual contestants.

Figure 1:
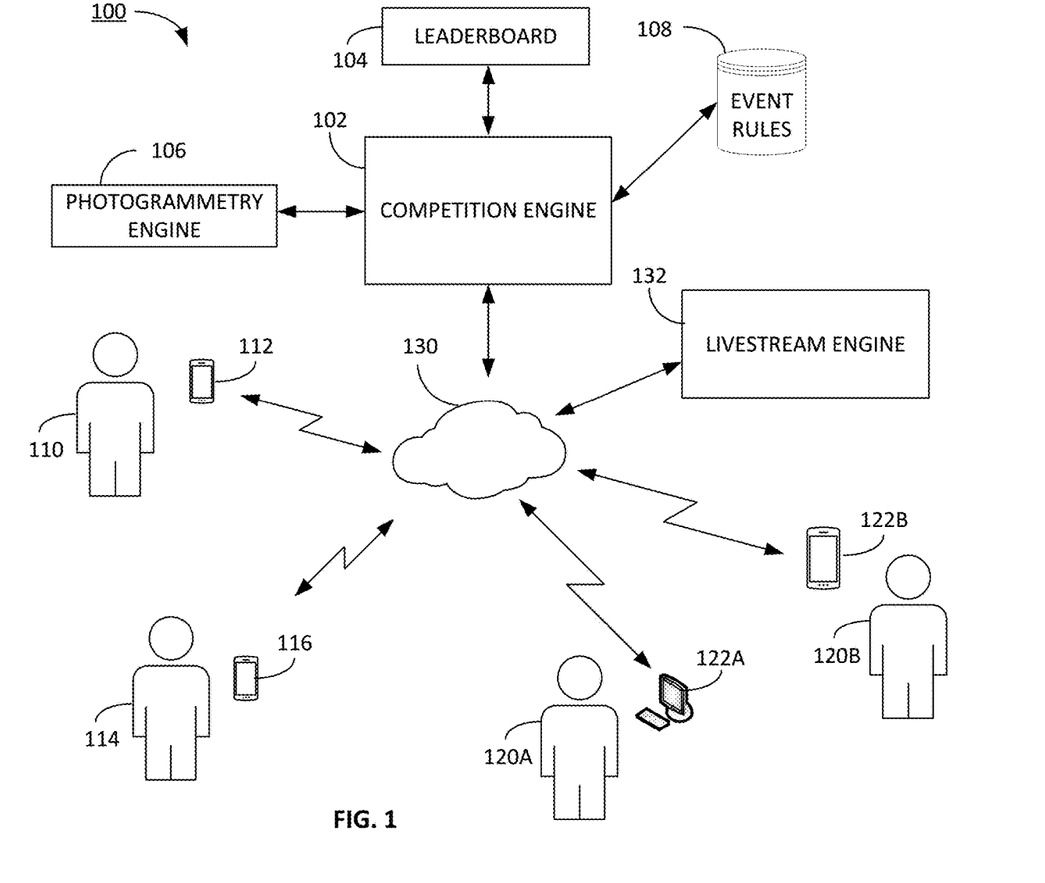
FIG. 1 illustrates one embodiment of a computing environment including a processing system for managing skill-based competitions.

FIG. 1 illustrates one embodiment of a computing environment providing for multiple players to compete in a common competition. The system 100 includes a competition engine 102, including a leaderboard processing module 104, a photogrammetry engine 106, and at least one database 108.

In the system, a first user 110 engages via a first computing device 112, a second user engages via a second computing device 114. In the system, viewers 120 engage via viewing computing devices 122.

The competition engine 102 connects with the computing devices 112, 114, as well as devices 122, via a network connection 130. The system 100 additionally engages a livestream engine 132.

It is recognized the illustrations of FIG. 1 omits any number of processing elements and/or processing devices as recognized by one skill in the art for the sake of brevity only. The operational features described herein may include or incorporate additional processing routines and/or devices as recognized by one skilled in the art and the system 100 is not expressly limited solely to the elements illustrated herein.

The competition engine 102 is one or more processing devices in a central or distributed network performing the processing operations described herein. For example, the competition engine 102 can include processing modules distributed across a number of connected processing devices, servers, or other cloud-based processing environment(s). For example, the competition engine 102 can include executables disposed with a self-contained processing device.

The leaderboard module 104 is a processing module for managing the leaderboard of the competition. This module 104 can be accessible across a distributed computing environment or in another embodiment can be disposed within the same processing server, device, or system of the competition engine 102.

The photogrammetry engine 106 may be a processing engine or a functional module or modules performing photogrammetry operations as described herein. Similar to the leaderboard module 104, the engine 106 can be disposed within a stand-alone processing device or operating system accessible across a computing environment or networked connection or in another embodiment can be disposed within the same computing environment of the competition engine 102.

The database 108 can be one or more data storage devices operative to store competition data, including event data, and related data associated with the competition engine and the execution of competition campaigns as described herein. The database 108 can be local and/or distributed data storage, such as being accessible across a networked environment.

The users 110, 114 can be any individual having accessibility to the competition engine 102 via one or more computing devices 112, 116, respectively. As described in greater detail below, the users 110, 114 generate contest submissions via the computing devices 112, 116 across the network connection 130. The computing devices 112, 116 may be any suitable type of computing device including but not limited to a smart phone, a mobile computer, a tablet computer, a gaming console, a desktop computer, a gaming tablet or device, an augmented reality or virtual reality headset, combination of interface elements, or any other suitable computing interfacing device.

The network 130 may be any suitable type of network facilitating network connectivity and data sharing thereacross. In one embodiment, the network 130 may be the Internet. The network 130 may include other networks as recognized by one skilled in the art including but not limited to virtual private networks, wireless networks connecting to broader networks, cellular or radio networks, by way of example.

The computing devices 122 can be any suitable device or devices capable of receiving streaming video content as well as accessing web-based content. The computing devices 122 can be a mobile or stationary computing devices using any suitable interfacing functionality for content viewing and feedback sharing or user interactions. For example, one embodiment can be a desktop computer or a gaming console with a local application or browser capable of viewing livestreaming content from the livestream engine 132. For example, one embodiment can be a mobile phone having an app thereon for viewing livestream content and interacting with a user interface relating to the competition, including interactions noted as below.

The livestream engine 132 may be any suitable livestream engine as recognized by one skilled in the art. By way example, one livestream engine may be the Twitch® engine available from Amazon, Inc.

The competition engine 102 operates to managing a skill-based competition, with users 110, 114, and an unlimited number of other users, competing by recording their competition attempts. It is recognized that for description purposes, the description herein refers to users 110 and 114, but the skill-based competition can include attempts by hundreds, thousands, or even millions of users over the course of the competition period. Competitors follow the same submission procedures as users 110 and 114 and the present competition is not expressly limited or narrowed to a competition solely between users 110 and 114.

The users 110, 114 engage the competition engine 102, acquiring event rules. The event rules relate to competing in the skill-based competition. The event rules outline the parameters of the competition, as well as the content capturing requirements. The event rules vary based on the specifics of the competition.

In one embodiment a user interface being executed on the computing devices 112, 116, can include a sign-on or other registration function. The user interface can include a description of the event, maybe even a demo video of the competition. The user can register or seek to enter via the interface, the application then providing the event rules and other functionality facilitating the user to properly and fairly complete, for example the user interface generating the livestream feed engagement, using one or more interface engines to verify camera position prior to beginning submission, providing a timer for the user, etc.

In one embodiment, the skill-based competition is a physical or in-person competition for performing one or more tasks. For example, the competition can be shooting a basketball, throwing darts, etc. In one embodiment, the skill-based competition can be a virtual or electronic task. For example, the competition can be competing in a video game competition or a virtual activity.

The event rules define the skill-based competition and the competition requirements. In the example of shooting a basketball, the event rules can define the size the basketball hoop, the circumference of the basketball, a minimum shooting distance, a maximum number of basketballs that can be used, among other factors. In the example of a video game competition, the event rules can define the video game and version, game parameters and skill settings, etc.

The event rules further define requirements for content capture. As described in greater detail below, one embodiment of the invention includes livestreaming the video submission. Therefore, the event rules can define a camera position for capturing the competition attempt while generating the livestream feed. The event rules may additionally include other livestream settings, such as image brightness, minimum video quality settings, audio settings, etc.

The event rules democratize the competition by ensuring that all competitors are beginning the competition under the same terms as other competitors. The event rules also dictate video submission and capture conditions allowing for verification and authentication of submissions, further insuring fairness between competitors.

Users 110, 114 then set-up their competition arena based on the event rules. In the example of shooting a basketball, this can include verifying the ball and hoop dimensions, verifying the distance from a shooting point to the hoop, and placing the livestream capturing device, e.g. mobile phone or camera, in a properly-designated location.

In one embodiment, competition submission is a two-step process. The first step is submitting a livestream feed. As noted in FIG. 1, the user 110 can directed a livestream feed to the engine 132 across the network 130. The livestream feed self-authenticates the user's submission because of the unlikelihood of cheating or video manipulation occurring in real-time during the livestream event.

The second step is submitting a self-generated score. Scoring can be part of the event rules. After the time period, the user then electronically submits their own score for the event. In the basketball example, scoring can be "1 point" for every completed free throw within a 3 minute period. If the user makes 24 free throws, the user then submits the self-generated score of 24.

Figure 2:
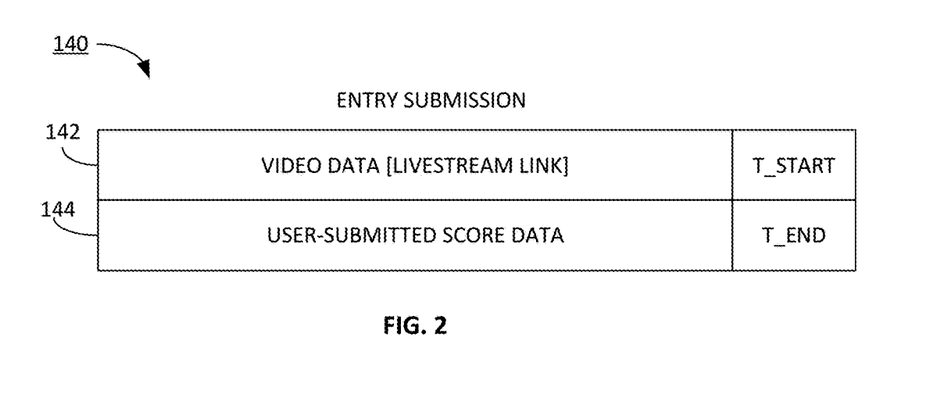
FIG. 2 illustrates a sample data structure of one embodiment of event rules for the skill-based competition.

FIG. 2 illustrates one embodiment of an entry submission 140. The entry submission 140 includes at least two data fields. The first field is a video data field 142, which in one embodiment is a livestream link. The livestream engine can distribute the livestream content and buffer said content, the buffered content accessible via the livestream link after the livestream session has ended. Where the livestream engine does not buffer content, a third party data storage system or service can be used to buffer livestream content for later viewing.

As noted in FIG. 2, the video data 142 is submitted at the start of the competition time. The user submits the livestream link as part of the process to begin entry submission.

The second field is a user-submitted score data field 144. This field can be a single value or a multiple of values based on the event rules. In the above example of shooting free throws, the data field 144 may be a value of 24 indicating having made 24 baskets. This data field is submitted at the end of the entry submission.

As described in greater detail below, the data field 144 offers a second self-authentication step for the competition engine 102.

After attempting the skill-based competition and submitting the entry submission with the video data and score data, the competition engine 102 processes the entry submission. The engine 102 uses the leaderboard 104 as part of the competition management.

Management of the competition can operate at two different stages. The first stage is the competition origination or submissions under a first threshold number. For example, the engine 102 may process the first set of submissions different from later submissions, where the first stage provides for establishing a leaderboard. For example, in one embodiment the engine 102 may collection submissions for a first 24 hour period and then generate a leaderboard based on that initial batch of submissions. For example, in one embodiment the engine 102 may collect a first 10,000 submissions and then generate a leaderboard. For example, in one embodiment the engine 102 may set a threshold score for the leaderboard and generate the leaderboard once submissions start exceeding that threshold number.

A second stage can be for managing the competition having an established leaderboard.

The transition from the first stage to the second stage can be based on a threshold amount of submissions, after a defined period of time, or other administration factor(s), as recognized by one skilled in the art.

In one embodiment, the competition engine 102 first filters submissions based on the score data 144 of FIG. 2. This filtering uses the leaderboard as its reference, the leaderboard including data indicating top submissions. The leaderboard 104 includes data sets of the top submissions, including score data. The competition engine 102 compares the score data (144 of FIG. 2) with the leaderboard data.

In this embodiment, filtering is based on if the entry submission either ties or beats a current leading score. If the submission is not likely to change the top of the leaderboard, the submission can be saved without verification because it will not affect or alter a winning submission.

If the comparison determines the submission may be a new top submission, the competition engine therein performs processing operations to verify the authenticity of the submission and the score. While the submission uses a livestream video feed, the competition engine 102 accesses a buffered version of the livestream feed. The buffered version of the livestream feed is accessed because while the livestream feed is being generated, e.g. while the user is competing, the score data (144 of FIG. 2) does not yet exist.

The competition engine 104 therein analyzes the video feed of the first user competing in the skill-based competition using photogrammetry routines. In one embodiment, these photogrammetry routines can be performed using the photogrammetry engine 106, which can be a stand-alone processing engine or one or more processing modules within the competition engine 102.

Photogrammetry verification includes analyzing the buffered livestream video feed for both compliance with the event rules, but also for calculating a verification score. Using photogrammetry techniques, the buffered version of the livestream is analyzed to measure specifics of the competition environment, for example measuring a height of a basketball hoop, measuring a circumference of a basketball, measuring a circumference of a basketball hoop, measuring a distance from the free throw line to the basketball hoop, etc.

Here, compliance with an event rule directing placement of the camera allows for photogrammetry verification operations. Having a defined camera distance allows for programming photogrammetry analysis conditions and uniform analysis of the video submissions.

Photogrammetry operations may utilize one or more existing photogrammetry engines and/or processing operations. These operations include video analysis with element detection routines with numerous video frames. The analysis facilitates measurements of the elements, for example measuring a distance between two elements, measuring a height of an element off the ground, detecting if an event occurs, e.g. a ball passing through a hoop, among other operations. In one embodiment, the photogrammetry operations may utilize existing known photogrammetry techniques. In further embodiments, the photogrammetry operations may be supplemented with processing instructions directed to or associated with the underlying event.

The photogrammetry analysis can also generate a verification score by analyzing the buffered livestream video and determining scoring events consistent with the event rules. In the example of shooting free throws, the photogrammetry analysis can determine a completed free throw and calculate a running tally of completed free throws in the competition time interval.

The video analysis offers multiple points of authentication. A first authentication is to verify compliance with the event rules. If the video analysis determines non-compliance, the entry submission is invalidated and discarded. If the video analysis determines the verification score differs from the user-submitted score data, the entry submission can be invalidated. In one embodiment, the submission may be invalidated if the user-submitted score data is less than the verification score, e.g. the user underreported his or her score.

The competition engine 102 then updates the leaderboard 104 as appropriate. For example, if the entry submission is properly validated as a new high-score, the engine 102 updates the leaderboard 104 to move the submission to the top of the leaderboard. For example, if the entry submission is not validated due to any number of inconsistencies, the leaderboard can either be left as-is with the entry discarded or the leaderboard can be updated to indicate the submission as received, authenticated, but not a winning submission.

Based on the operations of the competition engine 102, the various users, e.g. 110, 114, competing in the competition are assured of uniformity and fair play amongst fellow competitors.

Upon completion of the event time period, the leaderboard 104 provides for determining the event winner. For example, the event period can be defined in a number of days, such as 7 days, 30 days, etc. In one embodiment, the skill-based competition can include a prize, the competition engine 102 allows for distribution of the prize to the winner. For example, the prize can be a monetary prize, the engine 102 generating an electronic funds transfer. For example, the prize can be an online token or other element, the engine 102 transferring ownership to the winner.

In further embodiments, the competition engine 102 can additionally facilitate viewer engagement, with users 120 connecting the computing devices 122 via the network 130 to monitor the leaderboard 104, as well as view submissions, either directly via the livestream engine 132 or buffered content.

For example, if the competition includes 10,000 daily submissions, users 120 are not able or likely to watch that large number of livestream or buffered submissions. In one embodiment, the competition engine 102 can curate and/or distribute selected user submissions, such as any new first-place submissions, a submission of a selected or famous user, a random submission, etc.

The competition engine 102 can additionally interact with viewers 120 via their computing devices 122 for including online community activities including but not limited to social media postings, networking or sharing content with other social media or online platforms, chat rooms, fan pages, merchandise and other e-commerce content.

The competition engine 102 provides a centralized computing platform accessible via the network 130 for originating a skill-based competition, distributing the event rules and relaying instructions to would-be participants. The competition engine 102 additionally acts as the central platform for receiving entry submissions, authenticating and verifying the submissions, and managing the leaderboard. The competition engine 102 additionally acts as the central platform for managing viewer and user interactions before, during, and after the competition.

Figure 3:
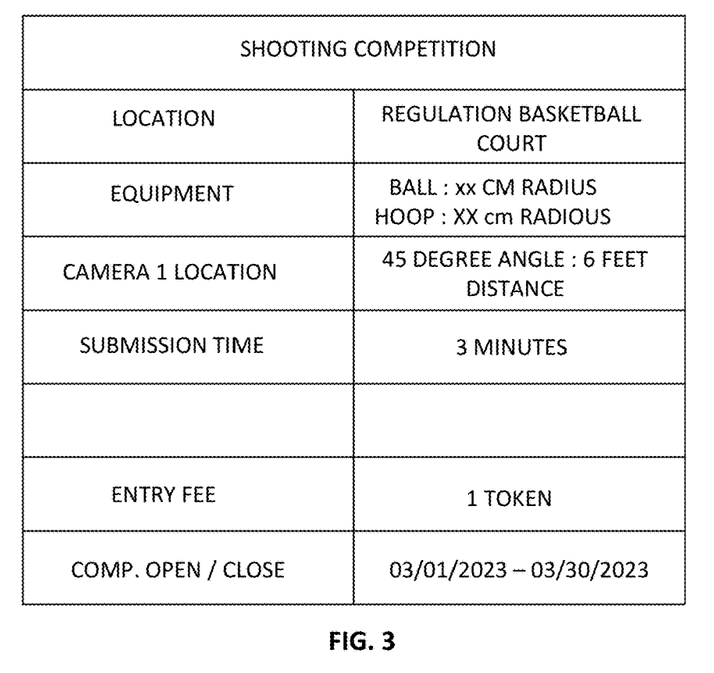
FIG. 3 illustrates an exemplary in-person skill-based competition.

FIG. 3 illustrates one exemplary embodiment of event rules. The event rules are data fields distributed to users and viewable via one or more user interfaces. The FIG. 3 event rules are exemplary rules for a basketball shooting competition. In this example, the first rules relating to the physical environment including the location being a regulation basketball court or half-court, the equipment being a regulation basketball and hoop, the camera location being at a specific location, and the duration of the competition being three minutes.

The exemplary FIG. 3 event rules can also include rules relating to the competition itself, such as an entry fee amount, in this embodiment being 1 token. The competition duration can also be noted, informing the user when submissions are allowed.

It is recognized the FIG. 3 data fields are exemplary in nature and not an explicit or required list of data fields. Additionally, the event rules can have any suitable number of rules as may be required or beneficial for facilitating a valid competition.

Figure 4:
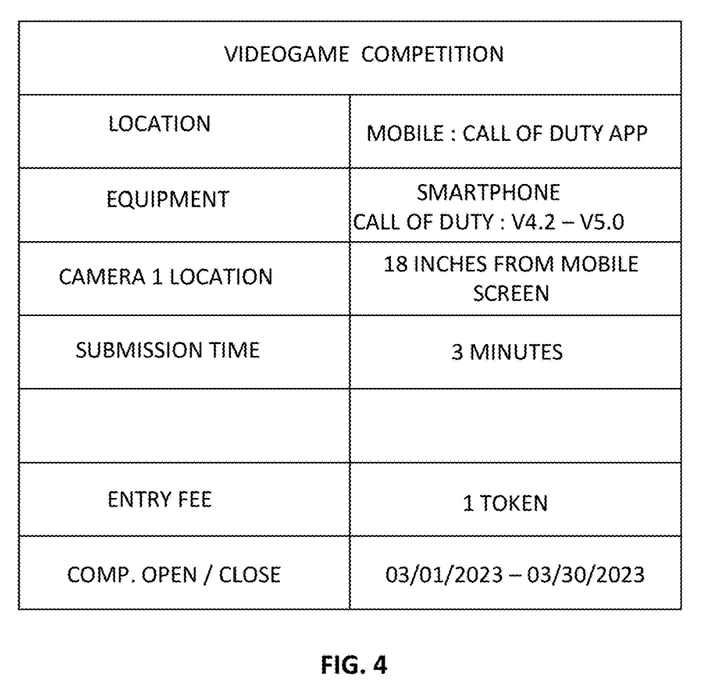
FIG. 4 illustrates an exemplary videogame skill-based competition.

FIG. 4 is another exemplary embodiment of event rules, this embodiment for a videogame competition. One exemplary videogame competition can be a self-contained gaming event within an existing game, such as a shooting competition to hit the highest number targets within a defined time period. In this embodiment, the event rules also include location, equipment, camera location, submission time, entry fee, competition duration as examples.

A videogame submission may include additionally or secondary livestream or recorded content as available from an in-person event. In some embodiments, a videogame competition may include livestreaming or buffered content capture of the videogame display as viewed by the user, as well as an external camera placed to capture both the user interacting with the gaming device and the gaming screen.

One example can be a user playing a shooting game on a mobile gaming device. A camera can be placed between the user and the gaming device, the phone capturing a livestream feed of the gameplay. The gaming device may additionally buffer and/or livestream the actual gameplay.

In this embodiment, the competition engine 102 may use both video feeds as part of the photogrammetry operations to authenticating and score the entry submission.

In one embodiment, an entry submission can require payment of a submission fee. The submission fee can be a monetary submission, for example a nominal fee of $1 per submission. The submission fee can be a non-monetary submission tied to a monetary reference. For example if the user purchases tokens and the submission fee is a token. For example, the submission fee can be presented in a cryptocurrency or some online asset.

In one embodiment, the competition purse or payout can be a percentage of the submission fee. In one embodiment, the competition purse can be a predetermined amount, whether in dollars, online or cryptocurrency, or an intangible element. For example, the competition purse can be a non-fungible token commissioned for the event.

Figure 5:
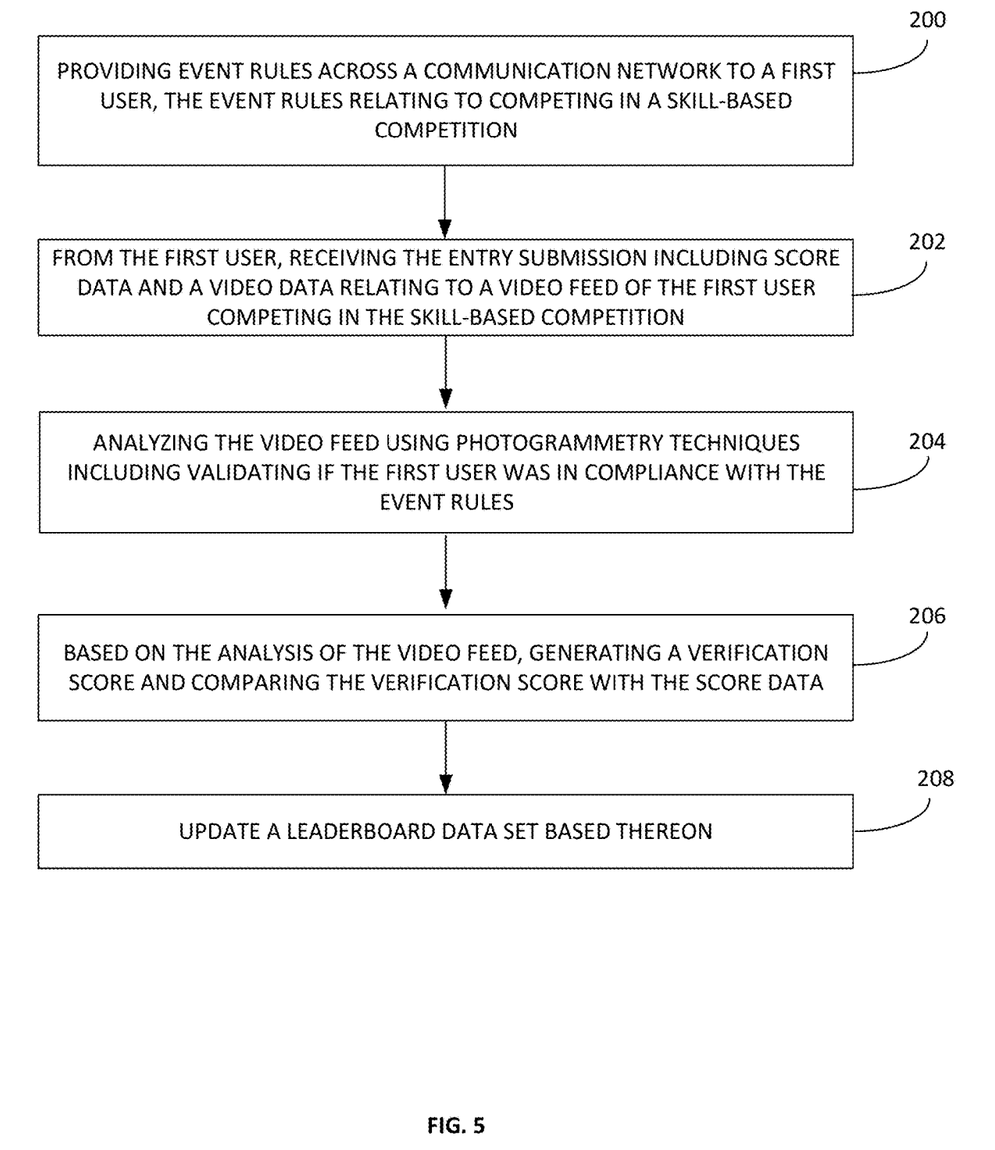
FIG. 5 illustrates one embodiment of a processing system from managing the skill-based competition.

FIG. 5 illustrates a flowchart of the steps of one embodiment of a computerized method for managing a skill-based competition. In one embodiment, these method steps can be performed using the processing system 100 of FIG. 1.

Step 200 is providing event rules across a communication network to a first user, the event rules relating to competing in a skill-based competition. Step 202 is receiving, from the first user, an entry submission of the user competing in the skill-based competition. The entry submission includes score data and video data relating to a video feed of the first user competing in the competition. In one embodiment, the video feed includes reference to a livestream of the competition attempt.

Step 204 is analyzing the video feed using photogrammetry techniques including validating if the first user was in compliance with the event rules. In one embodiment, all incoming entry submissions are analyzed using the photogrammetry techniques. In another embodiment, a filtering operation first determines if the video feed is worth analysis, where submissions not capable of winning the competition because the scores do not beat an existing high score are automatically discarded. In the embodiment of filtering submissions based on the existing leaderboard, the filtering save computing resources by avoiding photogrammetry analysis on non-winning entries.

Step 206 is generating a verification score with the video feed analysis and comparing the verification score with the score data. This comparison verifies the user self-reported a valid score. If the user complied with the event rules and submitted a valid score, step 208 is updating the leaderboard. If the user submission is a new top score, the leaderboard is updated to indicate the user as being in first place.

Based on user interaction and viewer interest, the method may include distributing the updated leaderboard information, as well as link to the buffered livestream, to viewers.

In one embodiment, the processing system 100 of FIG. 1 may additionally include video overlay processing routines for augmenting video output. For example, when distributing a new submission, e.g. a new first-place submission, a notable submission, or even a random submission, to viewers, the system 100 may embedded advertising content into the video.

In the example a basketball court, video overlay technology can insert an advertisement on the backboard as well as on the ground between the shooter and the hoop. Here, the processing system 100 may generate additional revenue for supporting the competition and the subsequent prize-money or purse by advertising content.

Figure 6:
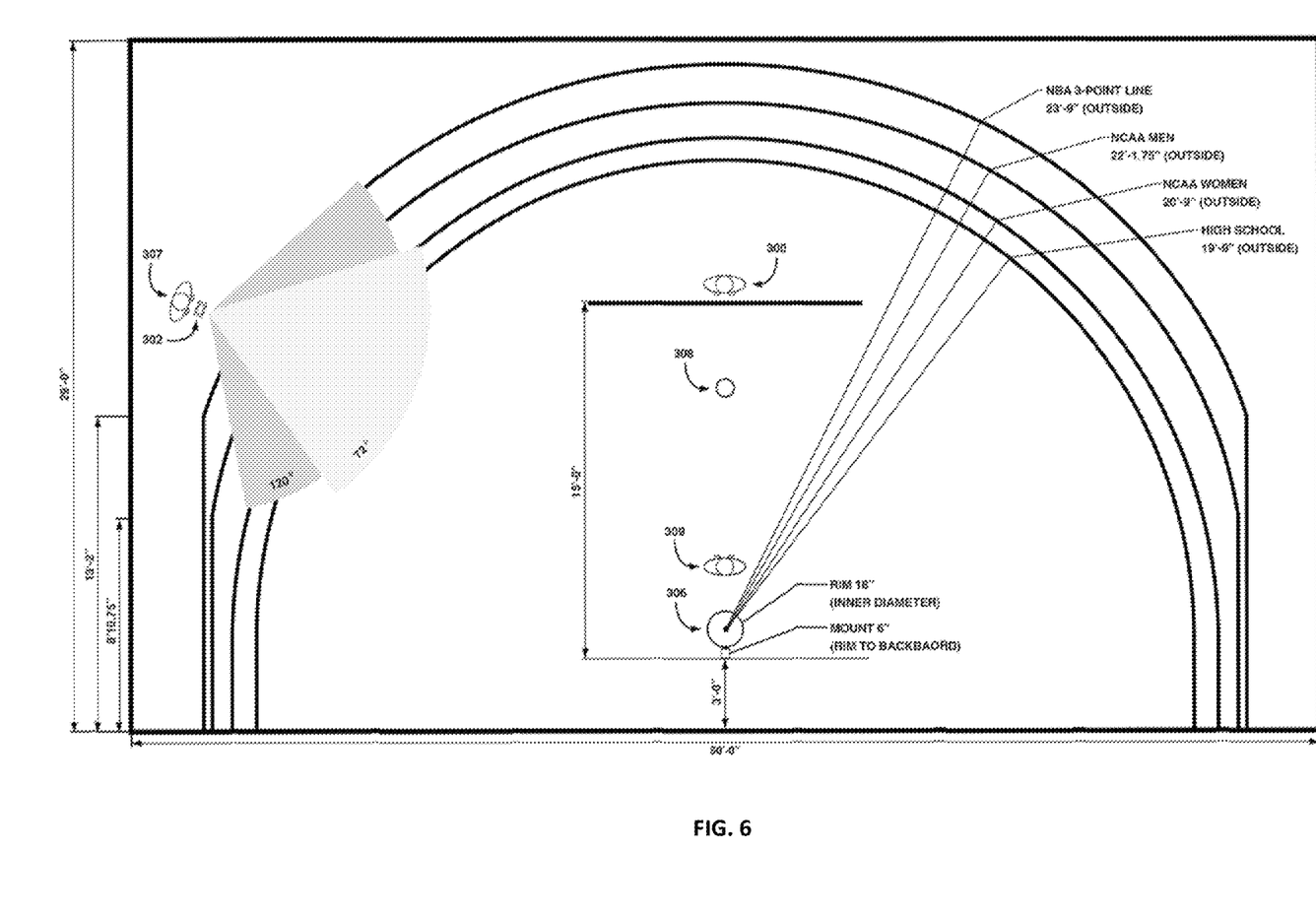
FIG. 6 illustrates a sample basketball shooting competition.

FIG. 6 illustrates one exemplary embodiment of a physical competition or event, a basketball shooting event. In this example, the competitor 300 is setup for shoot a basketball into a hoop. The set-up includes a video capture device 302 on a basketball court 304. The court 304 includes a hoop 306 and can include one or more basketballs 308. The court 304 may also include a free throw line 310 or other spatial delineation defining a distance from the basketball hop 306. In another example, the court 304 may include a three-point line. For making the competitions available to a larger group of participants, the court 304 may also include a user-generated distance, for example of the competitor does not have access to a basketball court with pre-marked lines, the user-generated distance can be a marker set at a predetermined distance.

Consistent with the method and system described above, the user 300 can set-up the capture device 302 to livestream the event, in this example being sinking as many free throws within a 3 minute time limit. As part of the rules, the basketballs 308 are regulation sizes, the hoop 306 is a defined distance from the shooting line, and the image capture device 302 is at a specific height and location from the user 300 and the hoop 306.

In this example, the rules may include a number of basketballs that can be used, for example minimizing the amount of time the user 300 spends chasing basketballs 308 versus time spent actually shooting.

Consistent with event rules, the competition can include a second user 307 holding the camera 302 to livestream the competition. Additionally, one or more individuals 309 can assist by rebounding and passing the ball 308 to the shooter 300. For example, the event rules can define the use of a set number of balls, such as 3 basketballs, e.g. minimizing the amount of time spent chasing or retrieving balls between shots.

FIG. 6 further illustrates available dimensions which can be defined for a valid competition submission. Different competition events or competition levels can be based on different measurements, including for example the court 304 being a defined dimension, such as a baseline distance of 60 feet designated free-throw line of 15 feet and various three-point line distances. As described herein, during competition, the image processing performed by the photogrammetry engine can validate the user compliance with the event rules, including distance, spacing, and sizing restrictions.

Additionally visible in this embodiment, the user 307 capturing the livestream can have a defined viewing scope for content capture. In this example, a first field of vision is defined as approximately 72 degrees of variance with an outer second field of vision at 120 degrees of variance. These measurements of 72 and 120 degrees are representative in nature and not expressly limiting dimensions.

The predetermined field of vision dimensions not only provide for viewability of the competition submission, but also for alignment and usability with the photogrammetry engine. The event rules can include defining the variable field of vision for moving the camera 302, which if moved outside the field of vision can distribute or invalidate photogrammetry validation processing routines.

Where FIG. 6 illustrates one example of a physical event or competition, the present method and system also applies to videogame or electronic events. The method and system facilitates competition integrity as noted herein.

Figure 7A:
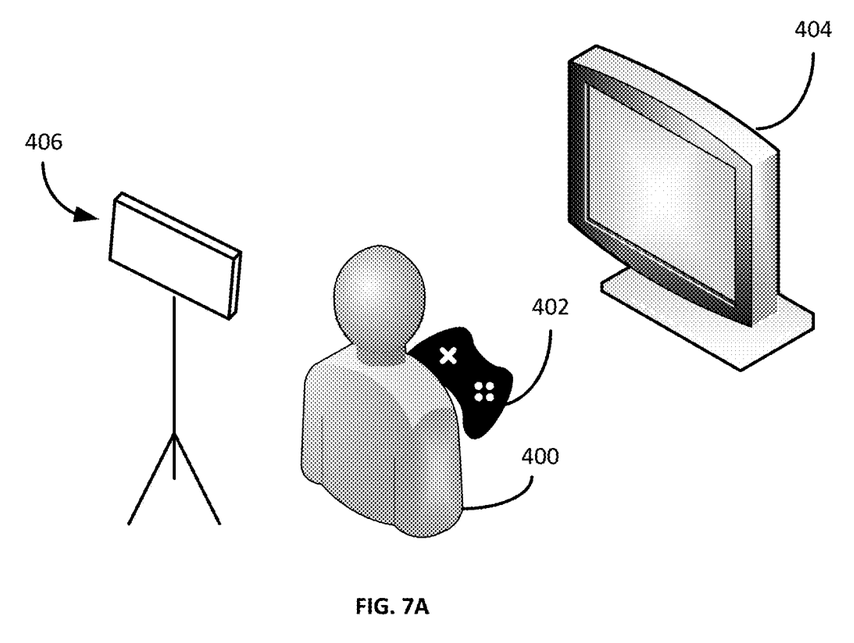
FIGS. 7A-7B illustrate sample videogame competitions.

FIG. 7A illustrates one example of a user 400 competing in a videogame event using a controller 402 and a computer monitor 404. The set-up, in this embodiments, includes a video capture device 406 positioned either adjacent to the user 400 or placed over the shoulder. In this embodiment, the video capture device 406 can see both the user's engagement of the controller 402 and the monitor 404. Thus, we livestreaming gameplay, viewers can both see the hand controls and the video output to ensure competition integrity.

In one embodiment, the livestream of gameplay may also include a livestream feed or complimentary video feed of gameplay content as generated by the gaming console, device, computer, etc. In one example, the livestream may include 2 concurrent streams, the first one being the video capture device 406 stream and the live gameplay stream, similar to the output on the monitor 404.

Figure 7B:
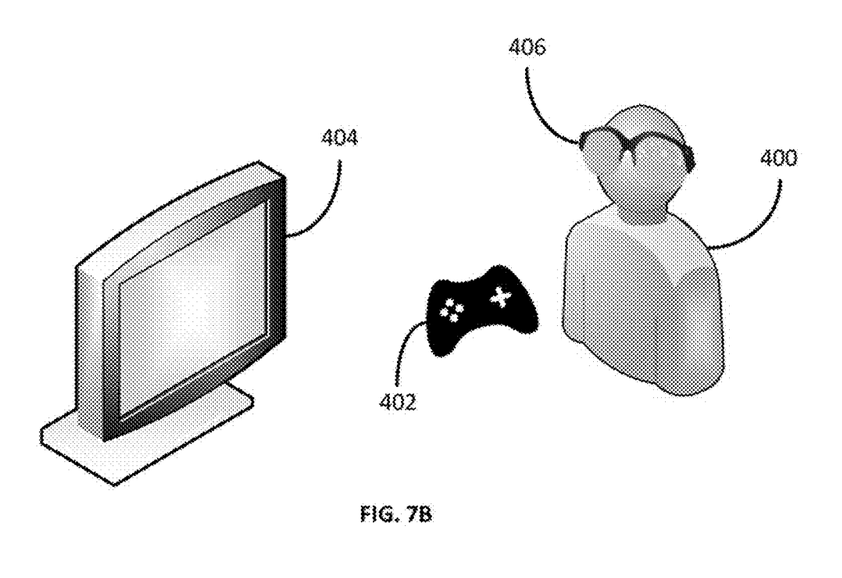

FIG. 7B illustrates another example of the user 400 with the game controller 402, monitor 404. In this example, the video capture device 406 is a pair of glasses, such as augmented reality or virtual reality glasses, worn by the user 400. Similarly, the output or livestream can also include livestreaming, as a separate or complementary feed, the videogame activities generated on the monitor 404. Whereas the video game competition embodiment can include 2 separate content feeds, the screen capture feed generated by the video game itself as well as an external camera or other video capture device livestreaming or otherwise recording the screen, gameplay, user interactions with controllers, etc.

The FIGS. 7A-7B illustrations are exemplary embodiments and the video game competitions can be any suitable set-up allowing for gaming content and image capture. For example, the gaming competition may be via any suitable gaming engine or console, with different rules or different competitions associated with individual platforms. In one example, if the competition is a mini-game competition for a third-party shooting game, the competition may be specific to a Sony® PS5 gaming platform versus a mobile app versus a desktop computer app.

In one embodiment, the controller 402 may be a mobile device with a screen for gameplay thereon. For example, the controller 402 can be a mobile phone having the videogame running thereon, the phone 402 operating both as the controller and the output display. In another embodiment, the controller 402 can be a mobile or touchscreen device for controlling gaming operations on the display 404. In another embodiment, the controller 402 can be a VR/AR device or devices having movement registered within the gaming environment.

Moreover, the present method and system can include any number of varying content capture routines or configurations and the noted embodiments herein are not expressly limiting. In one example, a gaming chair may include a mount for holding the content capture device, for example disposed directly over the shoulder of the user. In another embodiment, a mounting assembly can be placed on a desk or tabletop in front of the user, holding the content capture device between the user and the monitor. The varying embodiments may additionally include cable mounting or cable tracking elements to prevent power and/or data cables from interfering with the gameplay activities.

The videogame competitions may also include secondary or third-party software ensuring competition integrity. For example, one embodiment may include third-party software running concurrent with a video game to monitor user input and detect any cheating or anti-competitive behaviors. In another example, audio analysis software can be used to monitor the timing and sound effects of various actions within a videogame, for example monitoring a livestream audio clip to detect a "firebot" software illegally assisting a user for shooting accuracy in the game. In this example, the audio clip could analyze the sounds to determine a maximum or fastest rate of fire for a specific weapon and determine if the firing rate exceed as a baseline or standard level. In another example, software may analyze the settings of the game, for example detecting of an "aimbot" software module or script is running or having a competition rule that the user must first verify that no enhancement software modules or bots are running. In varying embodiments, the verification software may run before a competition starts, during the competition, and/or upon completion of the competition. For example, a pre-verification software routine can perform system analysis on the gaming engine or gaming device to verify no modifications, hacks, or unauthorized programs, executables, routines, are either being executed or capable of being executed.

Further pre-verification operations or routines can be utilized for ensuring the integrity of user submissions. For example, another pre-verification routine may include pre-streaming operations including screen displays, such as a showing an application screen displaying all of the active applications running on the device and/or go to a develop script search and submit a search string, such as a string cut/pasted from the event rules. Further pre-verification can include confirming the computing device or gaming platform has no unauthorized peripheral device(s).

In another embodiment ensuring competition integrity, one or more software modules or executable scripts can be used to pre-verify a second streaming device (SSD) providing the in-game streaming concurrent or complimentary to the gameplay capture.

The present method and system democratizes competitions by providing modules and processing operations for ensuring competition integrity. The method and system uses content capture device(s), processing modules, and image processing engines to authenticate competition submissions, as well as computing platforms for managing user submissions and leaderboard activities.

In addition to competitions, the method and system further facilitates development of games or competitions that fit within the network-based skill competition. The game development and associated game engines vary based on the competition being an in-person physical competition or a video or virtual competition.

Figure 8:
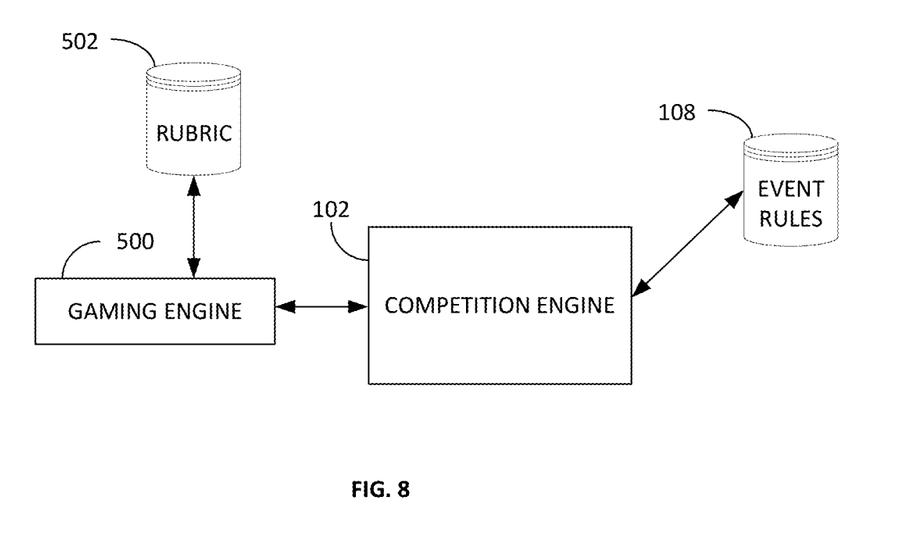
FIG. 8 illustrates one embodiment of a gaming engine for developing a physical in-person competition.

In both embodiments, the game engine operates via one or more processing devices performing processing operations relating to the development of the network-based skill competition and facilitating fair competitions between users. FIG. 8 illustrates one embodiment of game development engine 500. The engine 500 operates with the competition engine 102 of FIG. 1, with event rules database 108. In one embodiment, the game development engine 500 can generate the event rules.

The engine 500 performs processing operations using one or more processing devices for analysis of a competition and competition conditions. Database 502 can stored a development rubric defines guidelines, conditions, or values associated with different competition factors. As part of this rubric, events or event rules of a competitions can be assessed for determining if it meets the benefits of an in-person competition, includes features allowing for fairness between competitors, as well as rules or conditions for measuring or validating the integrity of a competition.

The rubric provides for finding a skill. In order to host the largest physical competitions the engine can focus on the most popular competitive sports; Soccer/Bball. A second rubric elements are location elements, examining the skill and create a game that utilizes the most standardizable elements of the particular competition environments. As for Bball, it requires a ball, hoop and some form of court or flat surface that must be at least 20'×20' in diameter. The only universally standardized dimensions on any official court is the hoop height, hoop diameter and free-throw line. And the freethrow line, unlike the 3 pt line (curved), is simple to apply to a drive hoop setup. Just need 2" duct tape, chalk, etc.

Therefore, by examining location elements, for Bball, the engine can move to next step, selecting or determining a specific challenge. It is most widely applicable game possible, that involves a hoop.

A third rubric element relates to physical gear elements. Add the fact that #7 sized NBA ball can be accessed/obtained worldwide, used to verify hoop diameter which allows us to verify hoop height and free throw line distance, the engine can determine needed elements for a proper competition fair to all users.

There are competition location/dimensional elements that pertain to physical court, pitch or field and equipment elements that have to do with the gear they use; basketball/sticks/bats, etc.

The rubric for the gaming engine examines the skill being addressed and creates games that are designed to let infinite entrants, solo or in teams, compete against one another from different locations. In the case of basketball, one on one will not work. Games need to be compliant with individual player versus infinite number of other individual players. So, a combined score challenge based on shooting from free-throw line is the most effective use of the skill's environment and gear.

An additional rubric element is making the competition manageable for not only the users but the platform in managing the submissions. In order to make the game manageable, including maximizing speedy verification, the engine seeks to limit the challenge to the shortest times possible to produce a clear winner. A further consideration can be reducing possibility of tied scores by augmenting the skill-based activity in order to concentrate the skill required to win; add a second ball and/or player into the mix. Use score-streaks to further lessen chance of ties. In case we do have a tie; split, rematch or user votes will decide how to proceed via user agreement.

Another rubric factor may be to only host games that can be verified in less the time is required to perform the competition. For example, a time constraint may be defining a competition time period to not exceed three minutes and therefore the scoring may be verified within that three minute interval, scoring verification using routines described herein including for example the photogrammetry engine.

Therefore, in one embodiment the rubric stored in the database 502 includes 6 computational factors: size of interest in sport; ease to create standardized competition environment from the available elements associated with a given sport; ease of pre-verification requirements and self reporting requirements; visual score-ability; chances of tied scores and competition time length; stack-ability of participants in a game; and ease of verification of scoring.

By way of illustration, table 1 illustrates a game engine rubric for various competition types. In the table: R-1 is the size of interest, popularity of the sport, R-2 is the ease to create a standardized competition environment; R-3 is the visual scoreability; R-4 is the chance of tied score; R-5 is stackability; and R-6 is ease of verification.

TABLE 1

| Sport | R-1 | R-2 | R-3 | R-4 | R-5 | R6 |
|---|---|---|---|---|---|---|
| Soccer | 1 | 1 | 1 | 1 | 1 | 1 |
| Basketball | 2 | 3 | 2 | 1 | 2 | 3 |
| Pool | 3 | 2 | 2 | 1 | 3 | 2 |
| Hand Dexterity | 4 | 1 | 1 | 1 | 4 | 1 |

In this example, there are four sample sports, each sport or activity having an associated value for the rubric factors. In this embodiment, the scores are 1 being a best score and 4 being a lowest score.

Based on these associated rubric values, the gaming engine can then compute associated values for assessing the competition types. By way of example, table 2 illustrates sample comparisons for the different competition variations of a single sport, in this example basketball, including using a number of basketballs and shooting a shot from the free throw line. In the table: R-1 is the size of interest, popularity of the sport, R-2 is the ease to create a standardized competition environment; R-3 is the visual scoreability; R-4 is the chance of tied score; R-5 is stackability; and R-6 is ease of verification.

TABLE 2

| Basketball | R-1 | R-2 | R-3 | R-4 | R-5 | R6 |
|---|---|---|---|---|---|---|
| 1-B 1-S 0-F FTC | 8 | R-2 = 3 | 1 | 8 | 8 | 1 |
| 1-B 1-S 1-F FTC | 5. | R-2 = 3 | 1 | 7 | 7 | 2 |
| 2-B 1-S 1-F FTC | 1.5 | R-2 = 3 | 2 | 6 | 6 | 3 |
| 2-B 2-S 2-F FTC | 2 | R-2 = 3 | 3 | 5 | 5 | 4 |
| 3-B 1-S 1-F FTC | 3 | R-2 = 3 | 4 | 4 | 4 | 5 |
| 3-B 2-S 2-F FTC | 4 | R-2 = 3 | 5 | 3 | 3 | 6 |
| 3-B 3-B 2-F FTC |   | R-2 = 3 | 6 | 2 | 2 | 7 |
| 3-B 3-B 3-F FTC |   | R-2 = 3 | 7 | 1 | 1 | 8 |

Here, the gaming engine can then score or computationally assess the various competition types and variations. From there, the gaming engine facilitates selection of an event and associated events rules for subsequent competition(s).

Figure 9:
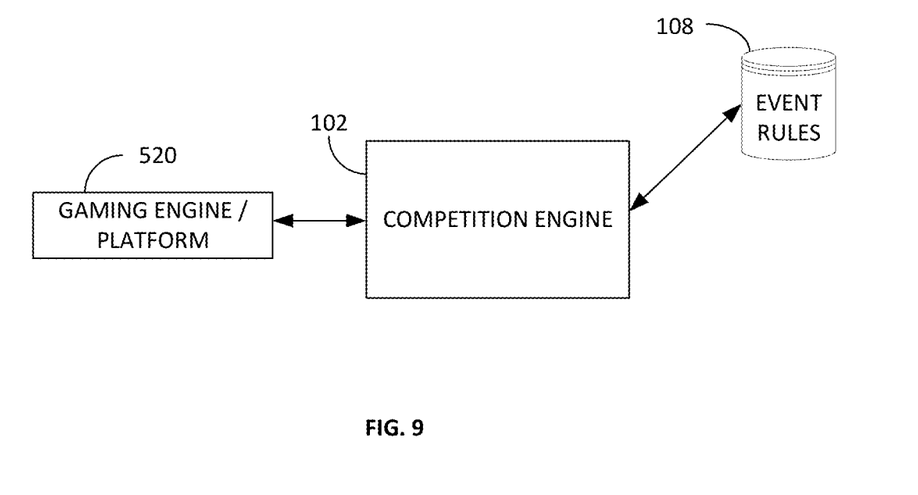
FIG. 9 illustrates one embodiment of a gaming engine for developing a video or virtual competition.

FIG. 9 illustrates the gaming engine/platform 520 relative to a video or virtual competition. As noted above, one of the important factors for a competition is fairness and insuring the integrity of gameplay. In the video or virtual space, there are electronic means for users to cheat or acquire unfair advantages. As the competition engine processes the outgoing video feed, underlying cheating modules can be difficult to detect.

The gaming engine 520 can be either a gaming application program interface (API) than integrates into an existing gaming platform or can be a separately designated gaming platform hosting the competition itself.

In the example of an API, the engine 520 can operate on top of the existing gaming platform or gaming engine and integrate anti-cheat processing modules. For example, one routine can be a scanning routine that periodically scans the processing engine for detecting any unauthorized helping software, by way of example an aimbot module. For example, one routine can be an audio tracking module that monitors the sounds of the game to detect any out-of-range frequency of activities, such as detecting a weapon rapid-fire rate exceeds a game-standard firing rate. Herein, the API operates on top of the pre-existing game engine to insure competition integrity and catch or detect unfair play factors not visually detectable in a livestream feed.

In the example of a gaming engine, the engine 520 can be a stand along gaming engine or processing environment. In this embodiment, the competition may be a gaming software application expressly developed on the engine 520. In this embodiment, where an API can operate with any commercially available software application, the engine as a platform 520 will have the videogame competition expressly developed for this platform. Here, the platform can then monitor or otherwise prohibit unfair user activities and insure competition integrity.

Figure 10:
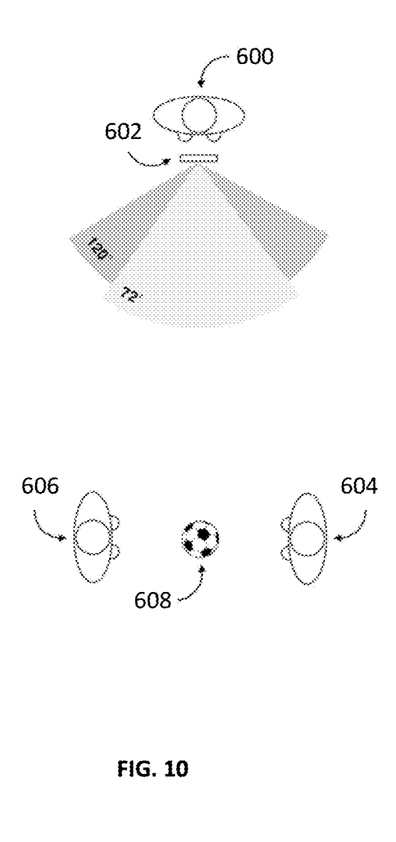
FIG. 10-12 illustrate graphical representation for layouts for physical in-person competitions.
Figure 11:
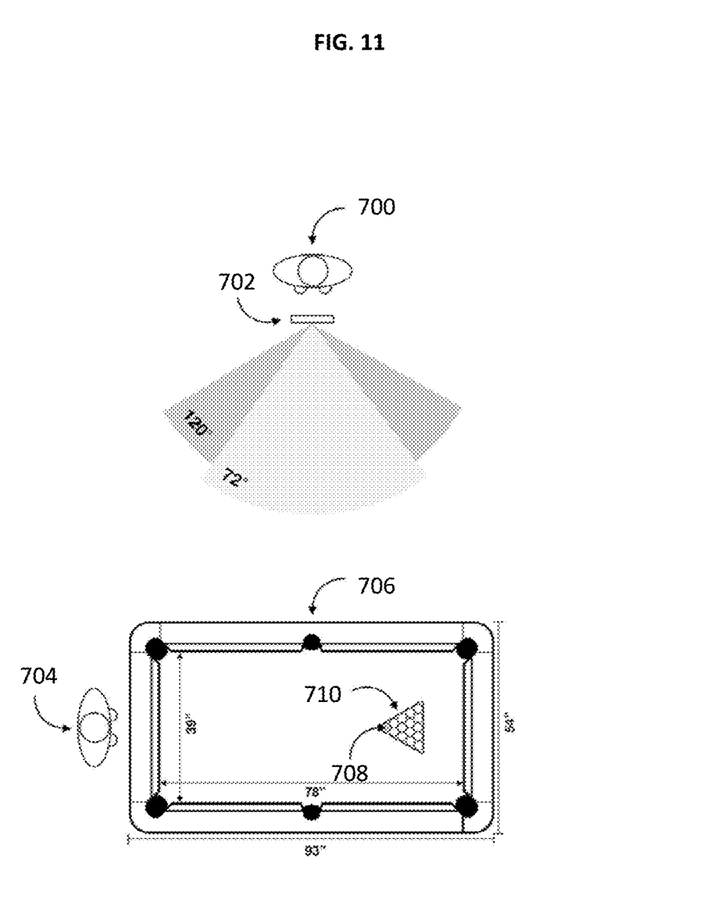
Figure 12:
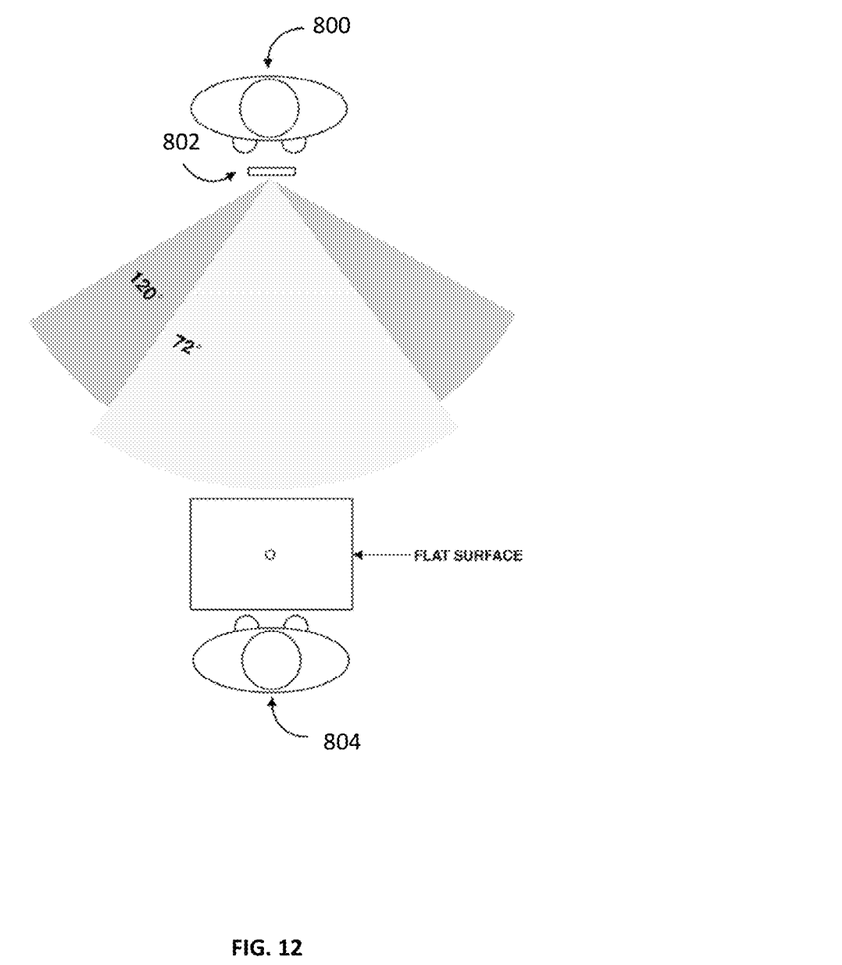

FIGS. 10-12 illustrates further graphical examples of set-ups for physical in-person competitions. FIG. 10 illustrates the example of a soccer competition, for example bouncing the soccer ball off the knee and passing between users without allowing the ball to touch the ground.

On a rubric, soccer rates higher as no hoop/court is needed. The soccer ball can be used in games that do not require the goal or any measured distances. In one embodiment, the game can be a 3 min, head knee head knee game, where one player heads to the other, the other player returns with the knee, first player returns with knee, second player returns with head, repeat. This process continue for specific time limit. The event rules could make the competition more difficult by making them alternate knees.

In this example, a user 600 holds a camera 602 to capture two players 604, 606 using the soccer ball 608. Also visible, this embodiment can include view range allowing for movement by users within the range but also allowing for content and score validation if needed.

FIG. 11 illustrates another exemplary competition using a pool table. The user 700 holds a camera 702 to capture competitor 704 using the pool table 706. By way of example, the event rules can include seeking to sink a specific numbered ball 708 from the rack 710. In another example, the competition can be for sinking the balls in a sequential or predetermined order.

In this embodiment, the pool table competition might rank lower on the rubric because of the limited availability of a pool table within the competition area. There may also be limitations on the sizing of tables, as it can be difficult to find a full size table versus a smaller table.

By contrast, FIG. 12 illustrates another exemplary competition of a hand dexterity competition. In this example, a user 800 holds a camera 802 to capture user 804 performing a dexterity event on a flat surface.

This competition may rate higher on the rubric, as a game people can play at the bar/anywhere they have a flat surface of approx 12 inches in diameter and a coin. For example, start with a US quarter. Spin coin with one hand, stop the spin with one finger from that hand, pick up coin with two fingers from that same hand, from the "stopped position", without letting the coin fall over. Repeat for three minutes, score-streaks apply.

Figures presented herein are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for managing a skill-based competition via network-based submissions, the computer method comprising:
    providing event rules across a communication network to a first user, the event rules relating to competing in the skill-based competition, wherein the skill-based competition is a physical competition and the event rules include at least one camera rule for placement of at least one camera capturing video data and at least one position rule for positioning of the first user relative to a target of the skill-based competition;
    via the communication network, receiving an entry submission from the first user, the entry submission including score data and the video data relating to a video feed of the first user competing in the skill-based competition, the video feed is captured by the at least one camera;
    analyzing the video feed of the first user competing in the skill-based competition using at least one photogrammetry processing technique, including validating if the first user was in compliance with the event rules while competing in the skill-based competition;
    based on the analysis of the video feed, generating a verification score; and
    updating a leaderboard data set based on the analysis of the video feed.

2. The computerized method of claim 1, wherein the analyzing the video feed by the photogrammetry engine comprises:
    determining a first distance between the first user and the target; and
    comparing the first distance with the event rules to determine if the first user was in compliance with the at least one position rule of the event rules.

3. The computerized method of claim 1, wherein the video data relating to the video feed includes a link to a livestream video feed.

4. The computerized method of claim 1 further comprising:
    receiving the score data via a user-submission field in a user interface, the score data electronically submitted by the first user upon completion of the entry submission.

5. The computerized method of claim 1, wherein the video data relating to the video feed includes a link to a livestream video feed.

6. The computerized method of claim 1 further comprising:
    receiving the score data via a user-submission field in a user interface, the score data electronically submitted by the first user upon completion of the entry submission.

7. A computerized method for managing a skill-based competition via network-based submissions, the computer method comprising:
    providing event rules across a communication network to a first user, the event rules relating to competing in the skill-based competition, wherein the skill-based competition is a physical competition;
    via the communication network, receiving an entry submission from the first user, the entry submission including score data and video data relating to a video feed of the first user competing in the skill-based competition captured by at least one camera, wherein the event rules include at least one camera rule for placement of the at least one camera capturing the video data and at least one position rule for positioning of the first user relative to a target of the skill-based competition;
    analyzing the video feed of the first user competing in the skill-based competition using at least one photogrammetry processing technique, including validating if the first user was in compliance with the event rules while competing in the skill-based competition; and
    based on the analysis of the video feed, generating a verification score.

8. The computerized method of claim 7 further comprising:
    updating a leaderboard data set based on the analysis of the video feed.

9. The computerized method of claim 7, wherein the analyzing the video feed by the photogrammetry engine comprises:
    determining a first distance between the first user and the target; and
    comparing the first distance with the event rules to determine if the first user was in compliance with the at least one position rule of the event rules.

10. A computerized method for managing a skill-based competition via network-based submissions, the computer method comprising:
 providing event rules across a communication network to a first user, the event rules relating to competing in the skill-based competition, wherein the skill-based competition is an in-game competition within a video game;
 via the communication network, receiving an entry submission from the first user, the entry submission including score data and video data relating to a video feed of the first user competing in the skill-based competition, wherein the event rules include at least one camera rule for placement of the at least one camera capturing the video data of the electronic video game and at least one setting rule for videogame gameplay when competing in the skill-based competition;
 analyzing the video feed of the first user competing in the skill-based competition using at least one photogrammetry processing technique, including validating if the first user was in compliance with the event rules while competing in the skill-based competition;
 based on the analysis of the video feed, generating a verification score.

11. The computerized method of claim 10 further comprising:
 updating a leaderboard data set based on the analysis of the video feed.

12. The computerized method of claim 10, wherein the entry submission includes an in-game feed capturing in-game gameplay and wherein the entry submission includes the video feed captured by at least one camera external to the electronic video game, the video feed capturing screen-based display of the in-game competition.

13. The computerized method of claim 12, wherein the at last one camera is mounted to at least one of: a chair, the user, a desktop, eyeglasses, a headset, and a tripod.

14. The computerized method of claim 10, wherein the analyzing the video feed by the photogrammetry engine comprises:
 validating the videogame gameplay is in compliance with the at least one setting rule; and
 comparing the in-game feed with the video feed.

15. The computerized method of claim 10, wherein the video data relating to the video feed includes a link to a livestream video feed.

16. A computerized method for managing a skill-based competition via network-based submissions, the computer method comprising:
 providing event rules across a communication network to a first user, the event rules relating to competing in the skill-based competition, wherein the skill-based competition is an in-game competition within a video game;
 via the communication network, receiving an entry submission from the first user, the entry submission is an in-game feed capturing in-game gameplay including score data and video data relating to a video feed of the first user competing in the skill-based competition;
 wherein the entry submission includes the video feed captured by at least one camera external to the electronic video game, the video feed capturing screen-based display of the in-game competition and wherein the event rules include at least one camera rule for placement of the at least one camera capturing the video data of the electronic video game and at least one setting rule for videogame gameplay when competing in the skill-based competition;
 analyzing the video feed of the first user competing in the skill-based competition using at least one photogrammetry processing technique, including validating if the first user was in compliance with the event rules while competing in the skill-based competition;
 based on the analysis of the video feed, generating a verification score; and
 updating a leaderboard data set based on the analysis of the video feed.

17. The computerized method of claim 16, wherein the analyzing the video feed by the photogrammetry engine comprises:
 validating the videogame gameplay is in compliance with the at least one setting rule; and
 comparing the in-game feed with the video feed.

* * * * *